US008128104B2

(12) United States Patent  (10) Patent No.: US 8,128,104 B2
Liao  (45) Date of Patent: Mar. 6, 2012

(54) GOLF BAG CART FRONT WHEEL FOLDABLE DEVICE

(75) Inventor: Gordon Liao, Yung Kang (TW)

(73) Assignee: Unique Product & Design Co., Ltd., Tainan Hsien (TW)

( * ) Notice: Subject to any disclaimer, the term of this patent is extended or adjusted under 35 U.S.C. 154(b) by 473 days.

(21) Appl. No.: 12/353,300

(22) Filed: Jan. 14, 2009

(65) Prior Publication Data

US 2010/0176577 A1   Jul. 15, 2010

(51) Int. Cl.
*B62B 1/20*   (2006.01)
(52) U.S. Cl. ...... 280/38; 280/47.34; 280/47.2; 280/651; 280/40
(58) Field of Classification Search ............... 280/47.34, 280/38, 652, 47.2, 651, 40
See application file for complete search history.

(56) References Cited

U.S. PATENT DOCUMENTS

| 7,137,644 B2 * | 11/2006 | Kimberley | 280/651 |
| 7,219,920 B2 * | 5/2007 | Lin | 280/651 |
| 7,770,912 B2 * | 8/2010 | Liao | 280/651 |
| 7,866,685 B2 * | 1/2011 | Liao | 280/651 |

* cited by examiner

*Primary Examiner* — J. Allen Shriver, II
*Assistant Examiner* — Erez Gurari
(74) *Attorney, Agent, or Firm* — Alan Kamrath; Kamrath IP Lawfirm, PA (57) ABSTRACT

A golf bag cart front wheel foldable device includes a fixed mount, a movable mount and a front wheel frame. The fixed mount has one end connected to the bottom tube of the cart frame and the other end provided with a fitted end. The fitted end is in pinned connection with a buckle at its one side. The movable mount is capable of being seized by the buckle and is joined fixedly to the fixed mount by a hinge. The movable mount has one end provided with a fitted end which is physically in harmony with the fixed mount. The front wheel frame has a top end connected fixedly to the movable mount, while its bottom end is joined to the front wheel. Through loosening of the buckle, the movable mount is not seized, which enables the movable mount and the front wheel frame to rotate with respect to the hinge, and the front wheel is then leveled for folding purposes, to achieve great handiness in maneuvering.

9 Claims, 16 Drawing Sheets

GOLF BAG CART FRONT WHEEL FOLDABLE DEVICE

BACKGROUND OF THE INVENTION

1. Field of the Invention

This invention relates to golf bag cart front wheel foldable devices and, more specifically, to one where the front wheel is leveled for folding purposes and the entire steps can be completed in one succession, which substantially improves maneuverability and simplifies the structure.

2. Description of the Prior Art

The latest prior art golf bag cart front wheel foldable device, U.S. Pat. No. 7,770,912, levels the front wheel first and then folds it up. This approach, no doubt, moderately shrinks the packing. However, its structure is still a bit more complicated, which calls for two successions of steps in maneuvering. It fails to accomplish the folding steps in a single succession, and annoyance in maneuvering apparently has considerable room for further improvement.

SUMMARY OF THE INVENTION

The objective of this invention is to provide a golf bag cart front wheel foldable device, where its front wheel is leveled first for folding purposes, and the complete folding steps are done in merely one succession which achieves absolute handiness in manipulation.

The other objective of this invention is to provide a golf bag cart front wheel foldable device with a plain structure.

To achieve the aforementioned objectives, this invention comprises: a fixed mount, having its one end connected to the bottom tube of a cart frame and the other end provided with a fitted end, where one side of the fitted end is in pinned connection with a buckle; a movable mount, capable of being grabbed by the buckle and being joined fixedly to the fixed mount by a hinge, where its one end is provided with a fitted end which is physically in harmony with the fixed mount; and a front wheel frame, having its top end connected fixedly to the movable mount, while its bottom end is joined to the front wheel. Through loosening of the buckle, the movable mount is not seized, which enables the movable mount and the front wheel frame to rotate with respect to the hinge, and the front wheel is then leveled for folding purposes, to achieve a handy manipulation.

DETAILED DESCRIPTION OF THE INVENTION

The structural traits and the achievable function of the present invention are detailed described in detail with reference to the following preferred exemplified embodiments and the accompanying drawings, which would help having a thorough comprehension of the present invention.

Referring to FIGS. 1~6, this invention comprises a fixed mount 1, a movable mount 2 and a front wheel frame 3. The fixed mount 1 is connected to a bottom tube 10 of the cart frame at its one end. The other end of the fixed mount 1 is provided with a fitted end having a cavity 11 therein. The cavity 11 is provided with a slope 12 and an orifice 13 at one side (left side), and the other side of the cavity 11 shapes a vertical plane and has a chamber 14 inside for accommodating a buckle 15. The buckle 15 is in pinned connection with a locking pin 17 at its inner side by a mat 16, which enables the buckle 15 to move an angle with the locking pin 17 as an axis. The outer portion of the middle section of the buckle 15 is jostled by a spring 18, to form a springy buckle 15. The outer side of the buckle 15 is a buckle slice.

The movable mount 2 is provided with a protruded fitted end 21 at its one end that is physically in harmony with the cavity 11 of the fixed mount 1. The fitted end 21 is also provided with a fitted slope 22 and a mount hole 23 at its one side. The fitted slope 22 fits the slope 12 of the cavity 11 of the fixed mount 1, while the mount hole 23 is joined to the orifice 13, for the penetration by a hinge 24 and fastening by a screw nut 25. The other side of the fitted end 21 has a bulge 26, for seizure by the buckle 15, which connects the fixed mount 1 and the movable mount 2.

The front wheel frame 3 is joined fixedly to the movable mount 2 at its top end and joined to the front wheel 30 at its bottom end by a shaft 31.

According to the aforesaid structural combination, shown in FIGS. 3-6, the front wheel frame 3 is joined fixedly to the bottom portion of the movable mount 2, which enables the movable mount 2, the front wheel frame 3 and the front wheel 30 to combine together. The fixed mount 1 is joined to the movable mount 2 by way of a good match between their corresponding fitted slopes 12, 22, and both connect to each other by the hinge 24. Through the seizure of the bulge 26 by the buckle 15, the fixed mount 1 and the movable mount 2 are fastened to each other.

Figure 1:
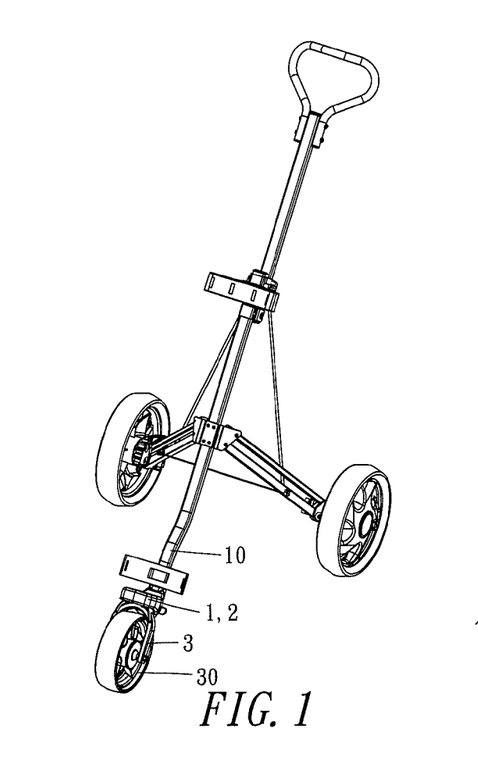
FIG. 1 is a three-dimensional view of the entire cart of the first exemplified embodiment of this invention.
Figure 2:
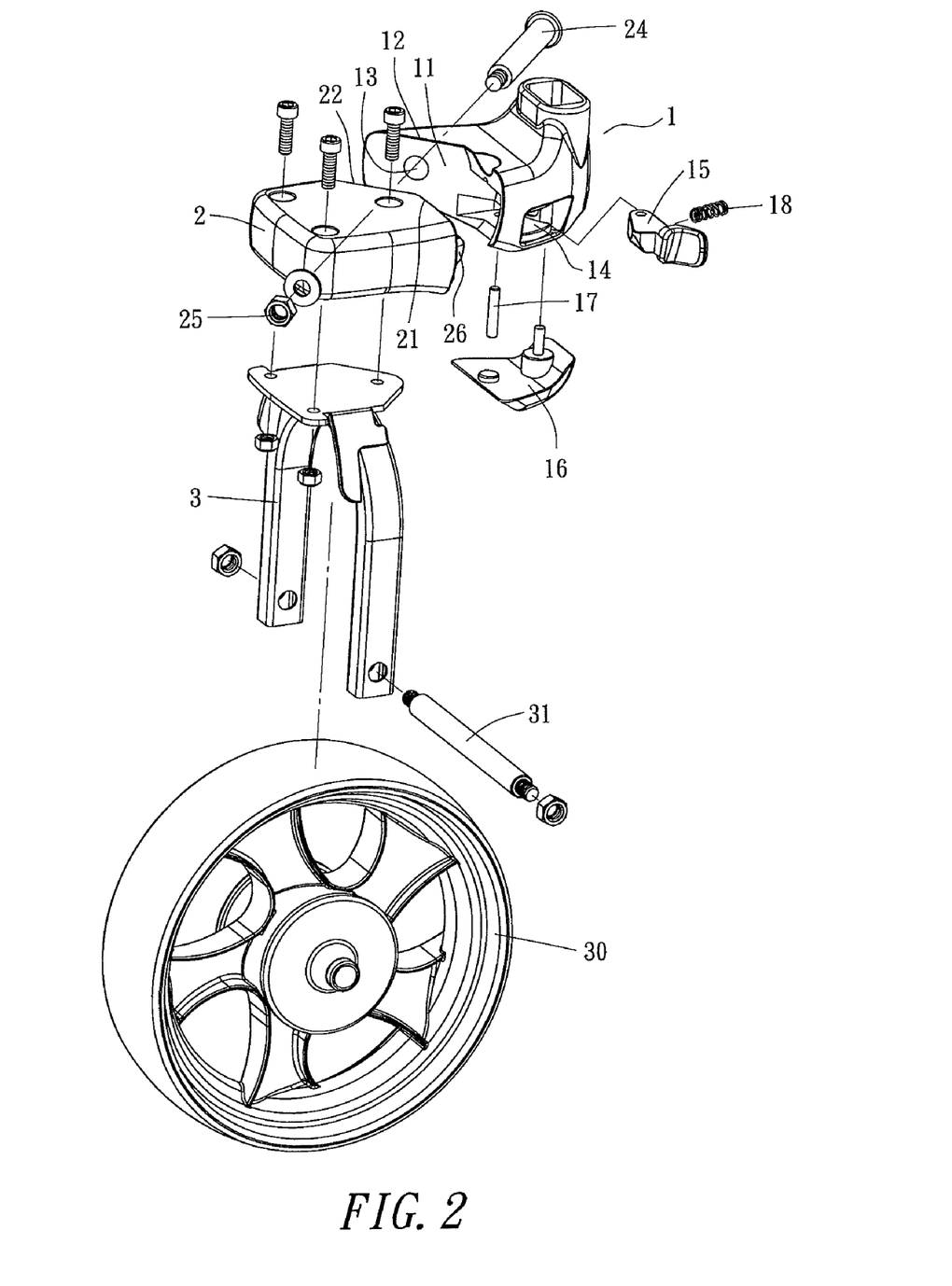
FIG. 2 is a three-dimensional exploded view of the first exemplified embodiment of this invention.
Figure 3:
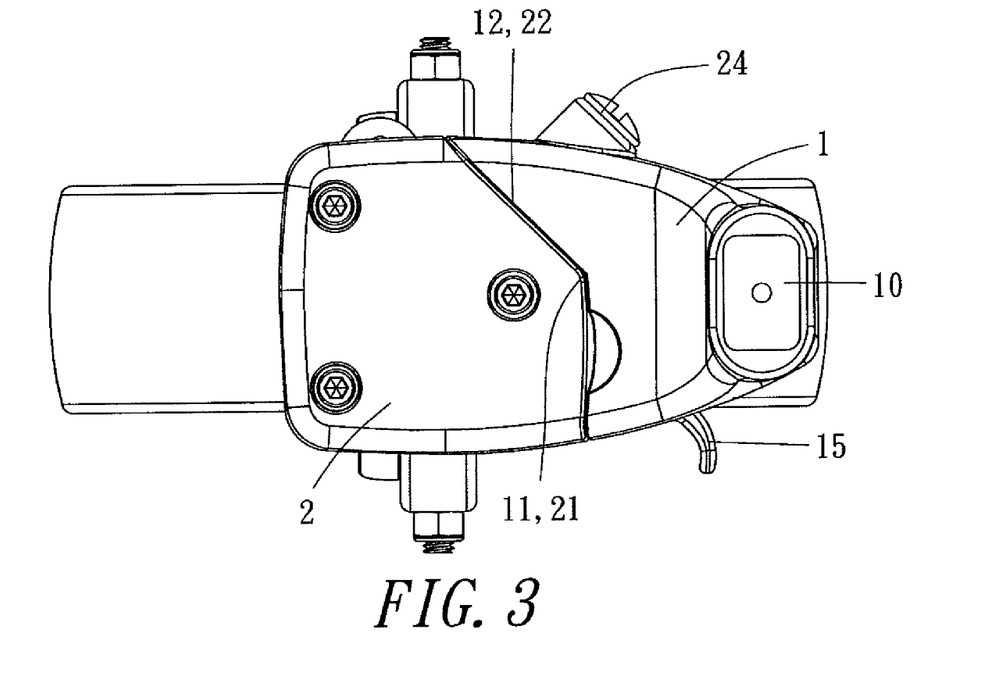
FIG. 3 is a top view of the first exemplified embodiment of this invention.
Figure 4:
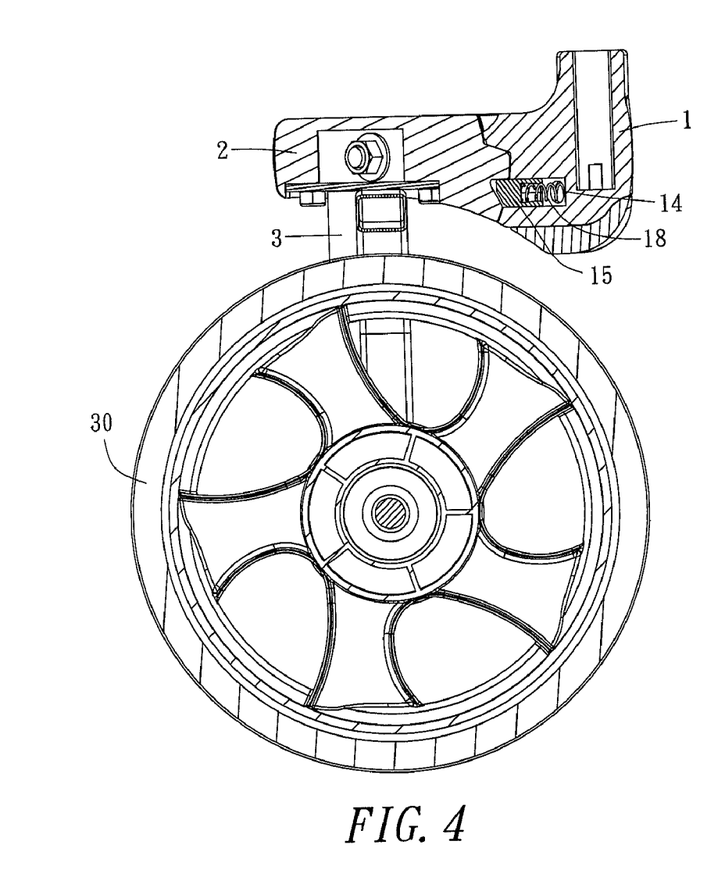
FIG. 4 is a longitudinal sectional view of the first exemplified embodiment of this invention.
Figure 5:
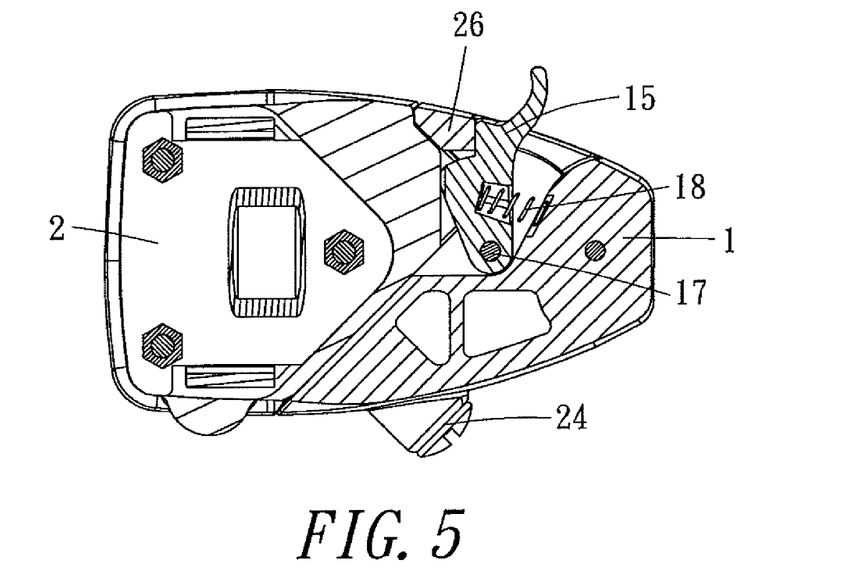
FIG. 5 is a transverse sectional view of the first exemplified embodiment of this invention.
Figure 6:
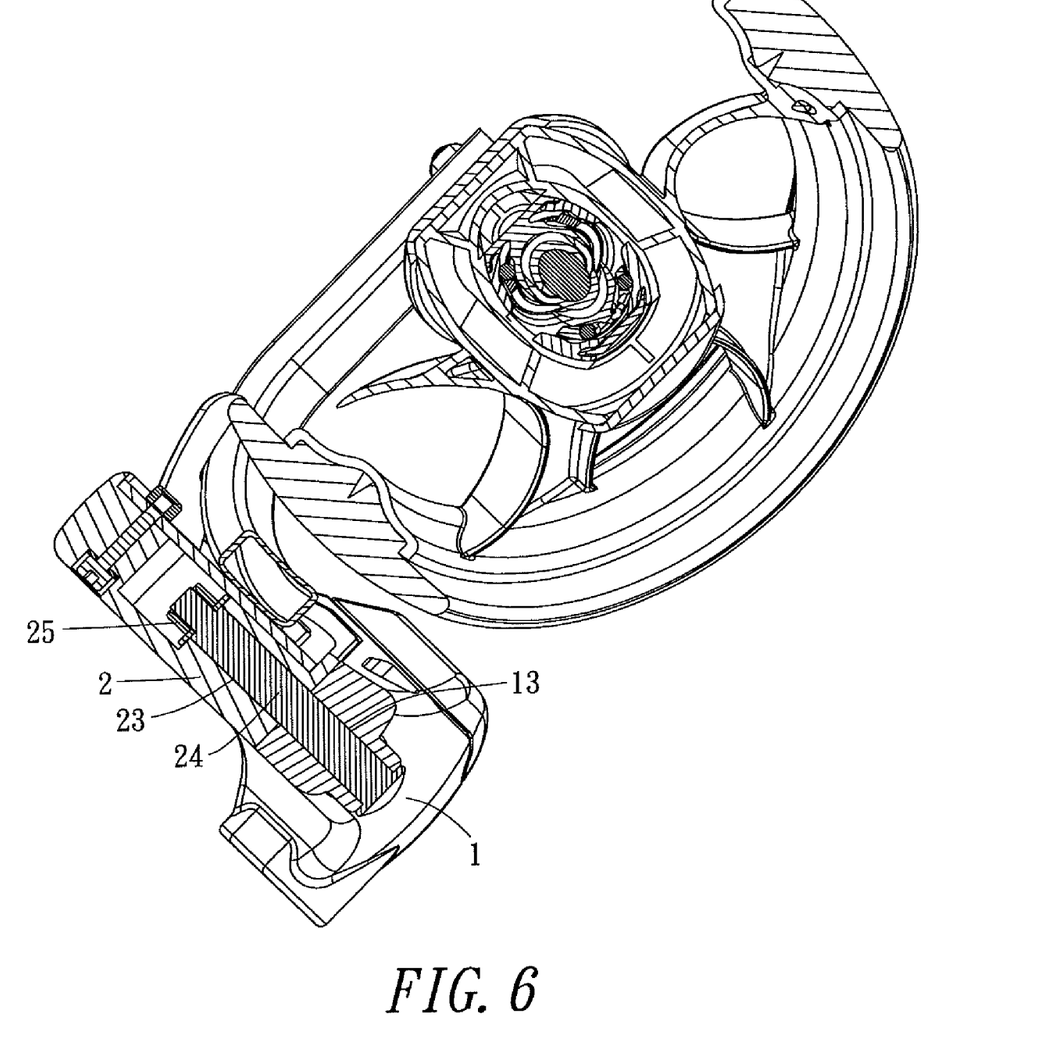
FIG. 6 is an axial sectional view centered by the hinge of the first exemplified embodiment of this invention.
Figure 7:
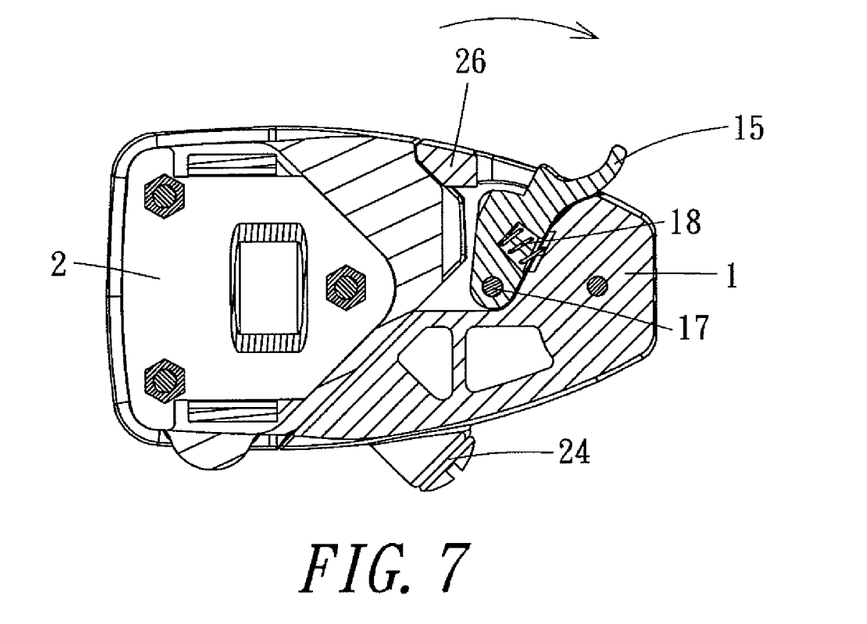
FIG. 7 is a transverse sectional view of the loosening of the buckle of the first exemplified embodiment of this invention.
Figure 8:
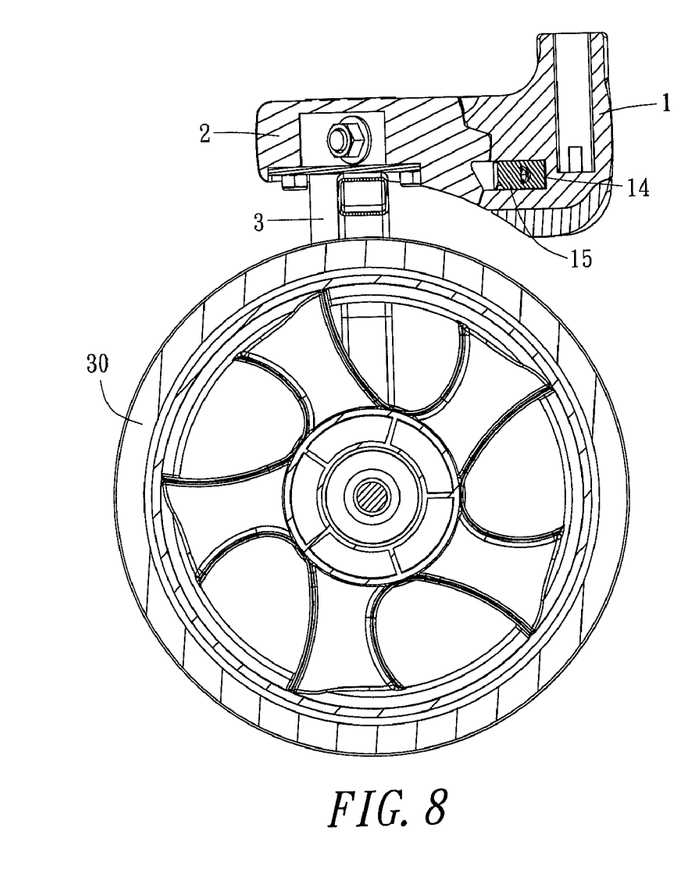
FIG. 8 is a longitudinal sectional view of the loosening of the buckle of the first exemplified embodiment of this invention.
Figure 9:
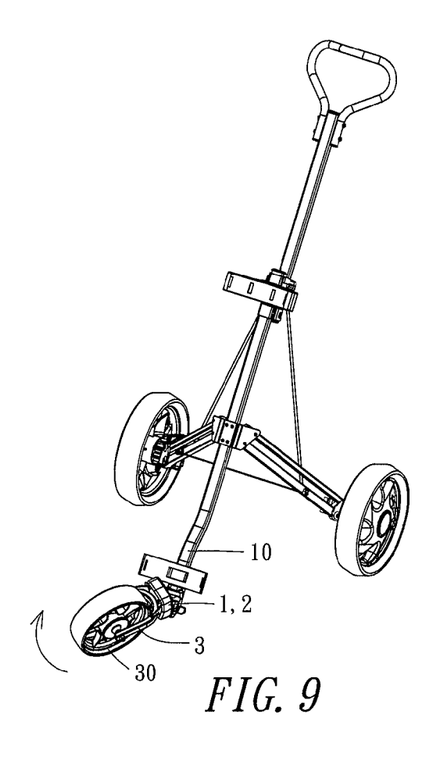
FIG. 9 is a schematic diagram of the motion of the folding of the first exemplified embodiment of this invention.
Figure 10:
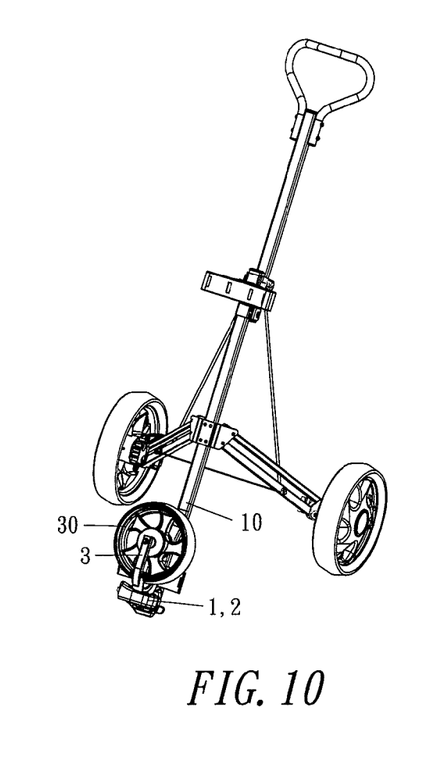
FIG. 10 is a three-dimensional view of the folding of the first exemplified embodiment of this invention.

When folding, the procedure starts by loosening the buckle 15 by pulling it outward to disconnect with the bulge 26, shown by the direction of the arrow in FIG. 7, so that the movable mount 2 is not in seizure. This is followed by rotating the movable mount 2, the front wheel frame 3 and the front wheel 30 leftward with respect to the axis defined by the hinge 24 and pulling upward so that the front wheel 30 is parallel to and in a nestling arrangement against the outer side of the cart frame, shown in FIGS. 9 & 10, to accomplish the leveling of the front wheel 30 for folding purposes. Tightening the buckle 15 again to stabilize the movable mount 2 and the front wheel frame 3 (the front wheel 30) will reduce the volume of the packing, will cut down the transportation cost, and will diminish the storeroom space. The movable mount 2 then experiences a 180-degree turn and is in harmony with the fixed mount 1 through the match between their respective slopes 12 and 22. The buckle 15 stabilizes the fixed mount 1 and the movable mount 2 by the elastic force of the spring 18.

Accordingly, the folding apparatus of this invention is made up of the fixed mount 1 and the movable mount 2 only, and both have fitted ends (the cavity 11 and the fitted end 21) to harmonize with each other. Moreover, they can also stabilize or rotate with respect to each other through the use of the hinge 24 and the buckle 15. Its structure is pretty simple. During maneuvering of folding, the buckle 15 is simply pulled outward, and the movable mount 2 and the front wheel frame 3 are then ready to be rotated and pulled upward, which enables the front wheel 30 to be leveled for attaching to the cart frame. Thus, leveling of the front wheel 30 for folding can be completed in just one succession. The manipulation is even more handy, which is absolutely novel and practical than the prior art.

Besides, this invention may also have the fitted slopes 12, 22 designed in a reversed orientation (right side), and the hinge 24 and the buckle 15 are also placed to the other side. The movable mount 2 is rotated rightward and pulled upward, to level the front wheel 30 for attaching to the outer side of the card frame, which accomplishes the same function as the aforesaid embodiment.

Figure 11:
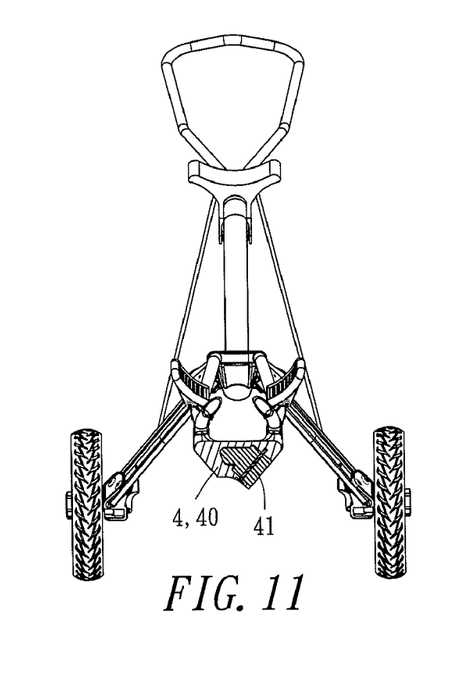
FIG. 11 is a partial sectional view of the entire cart of the second exemplified embodiment of this invention.
Figure 12:
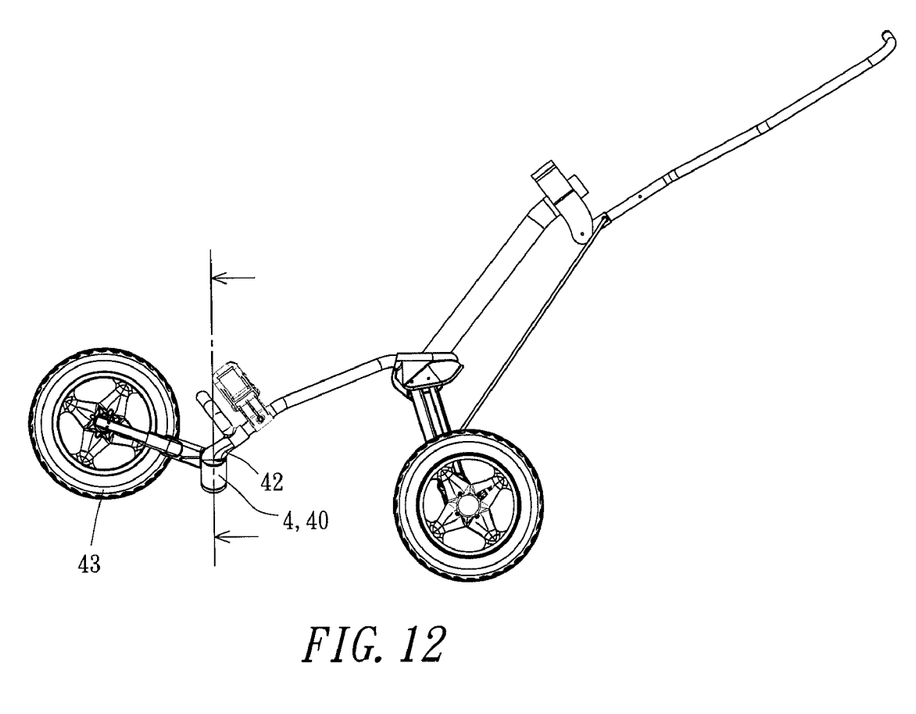
FIG. 12 is a side view of the entire cart of the second exemplified embodiment of this invention.
Figure 13:
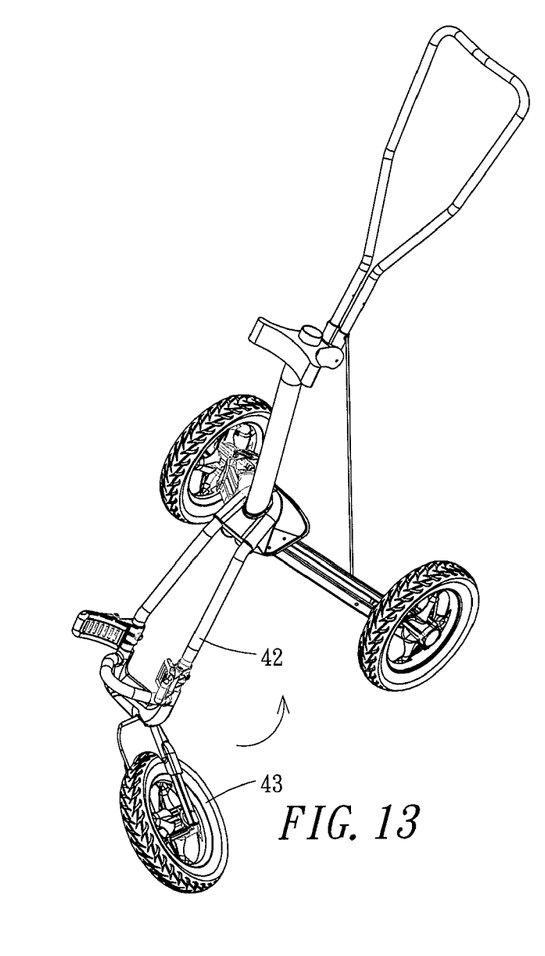
FIG. 13 is a schematic diagram of the motion of the folding of the second exemplified embodiment of this invention.
Figure 14:
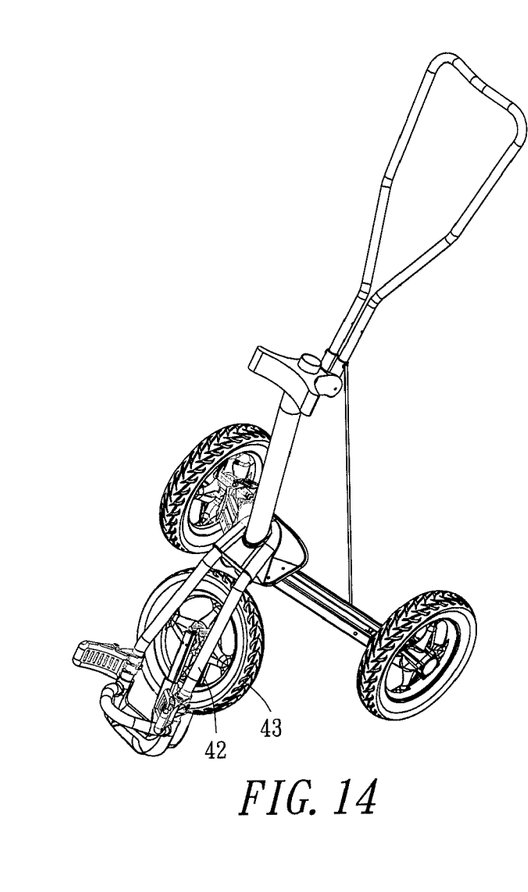
FIG. 14 is a three-dimensional view (I) of the folding of the second exemplified embodiment of this invention.
Figure 15:
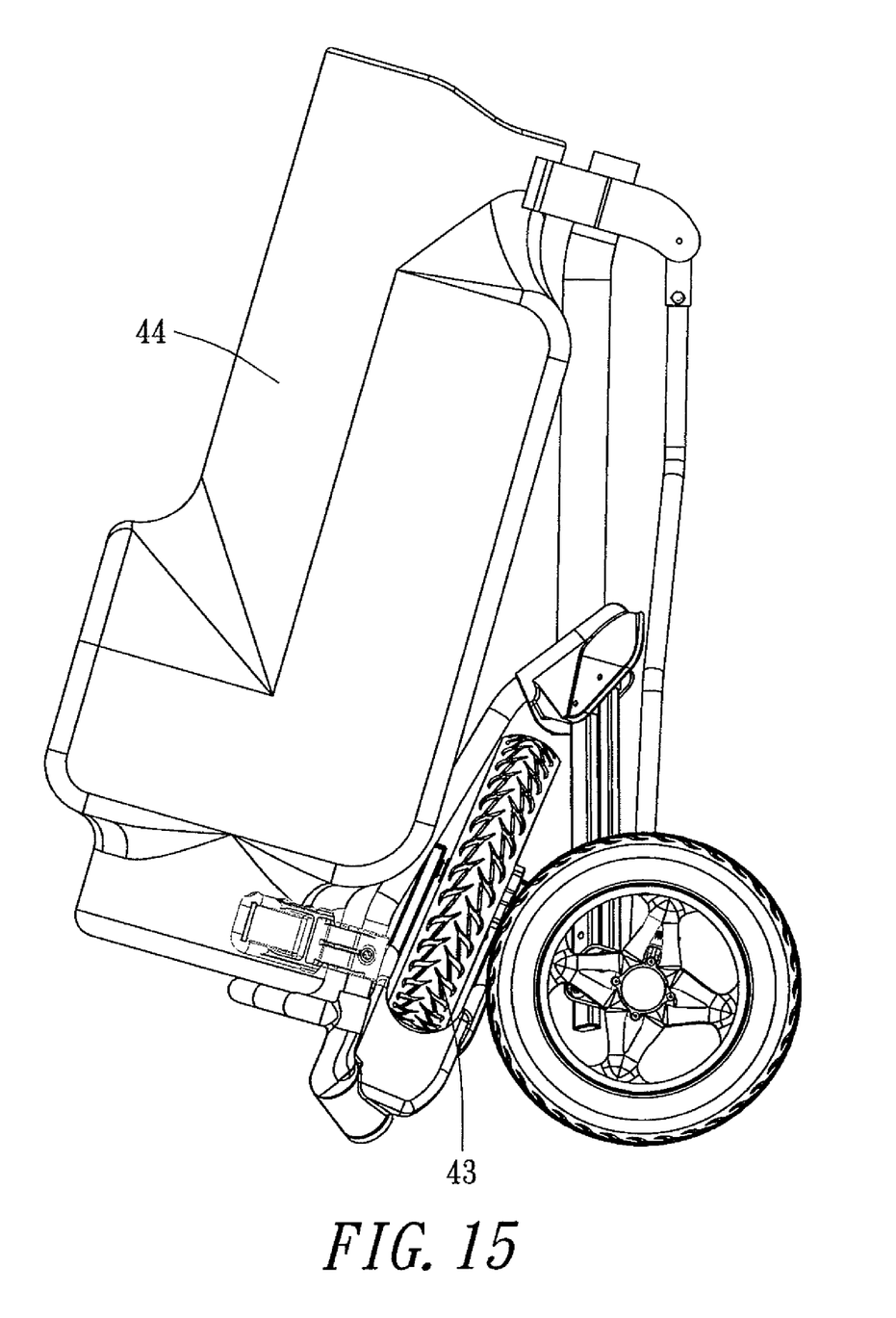
FIG. 15 is a three-dimensional view (II) of the folding of the second exemplified embodiment of this invention.

Referring to FIGS. 11 & 12, the present invention may have the hinge 41 designed in the other side (right side), to link the movable mount 4 and the fixed mount 40 fixedly. The movable mount 4 and the fixed mount 40 are located at the bottom end of the bottom tube 42 of the cart frame, which enables the movable mount 4 to be rotated rightward and pulled upward, for leveling the front wheel 43 for folding and attaching it to the inner side of the cart frame, as shown in FIGS. 13 & 14. The cart frame can be directly folded without unloading the bag 44, shown in FIG. 15, which accomplishes not only the function as the aforesaid embodiment but the great handiness for using. This is the second exemplified embodiment of the present invention.

Figure 16:
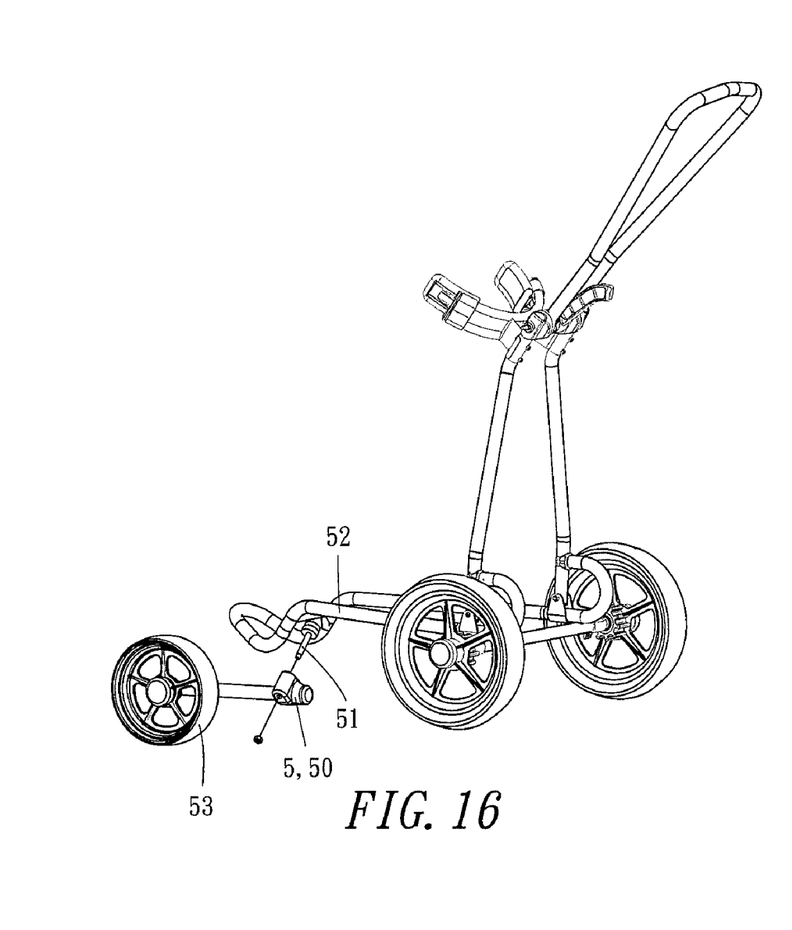
FIG. 16 is a three-dimensional exploded view of the major portions of the entire cart of the third exemplified embodiment of this invention.
Figure 17:
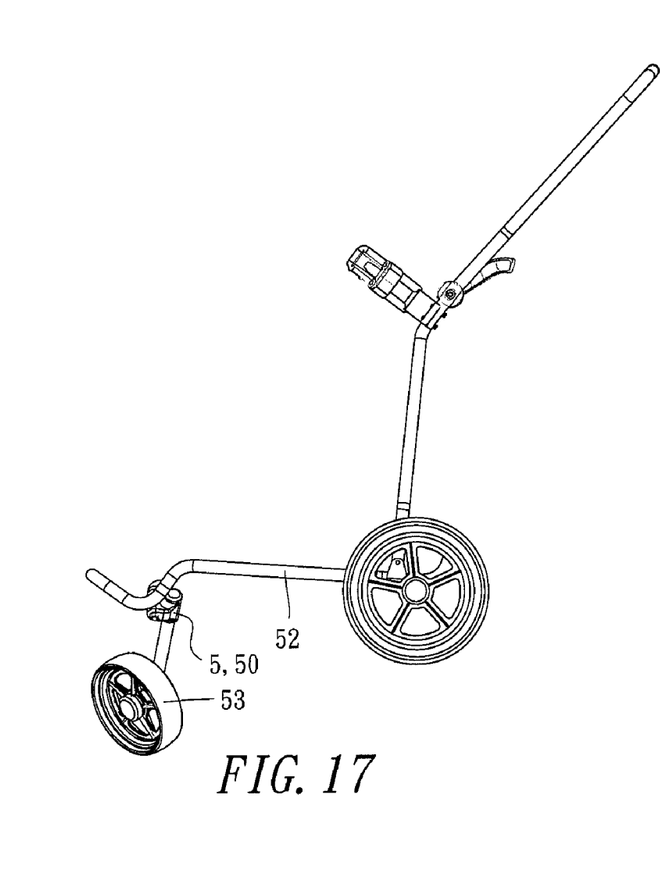
FIG. 17 is a side view of the entire cart of the third exemplified embodiment of this invention.
Figure 18:
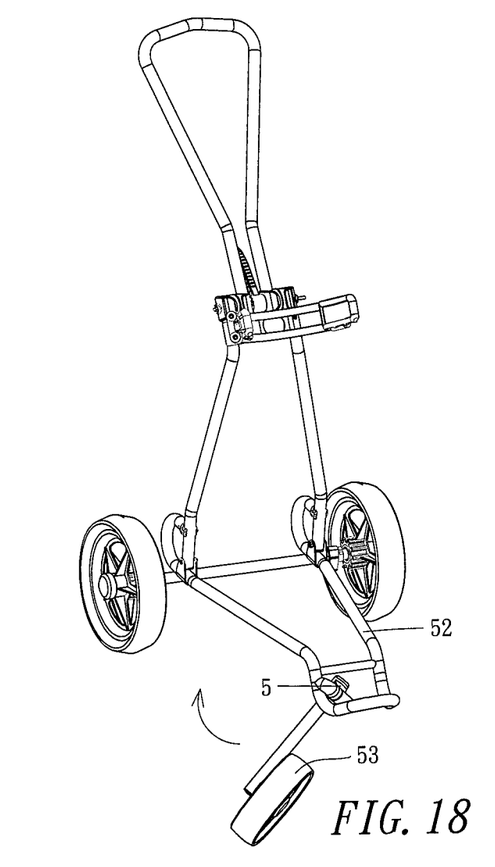
FIG. 18 is a schematic diagram of the motion of the folding of the third exemplified embodiment of this invention.
Figure 19:
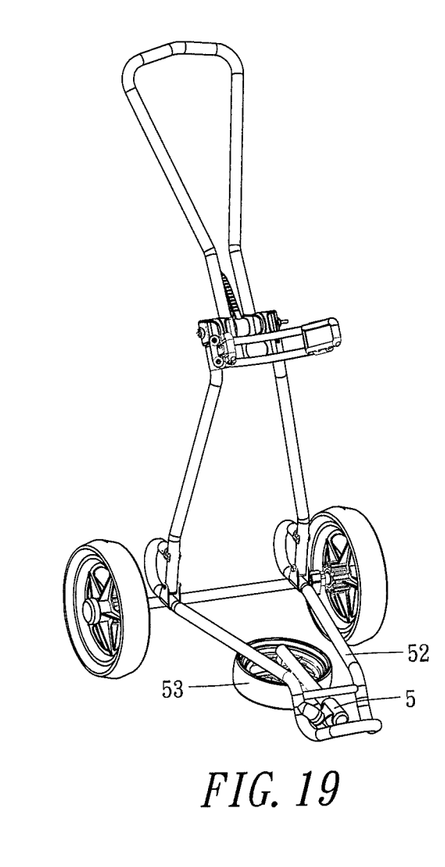
FIG. 19 is a three-dimensional view of the folding of the third exemplified embodiment of this invention.

Referring to FIGS. 16 & 17, the present invention may have the hinge 51 soldered directly to the bottom tube 52 of the cart frame to link the movable mount 5 and the fixed mount 50 fixedly at the bottom end of the bottom tube 52 of the cart frame. The movable mount 5 is rotated leftward and pulled upward, for leveling the front wheel 53 for folding and attaching it to the bottom side of the cart frame, as shown in FIGS. 18 & 19, which achieves the function as in the first exemplified embodiment above. This is the third exemplified embodiment of the present invention.

Figure 20:
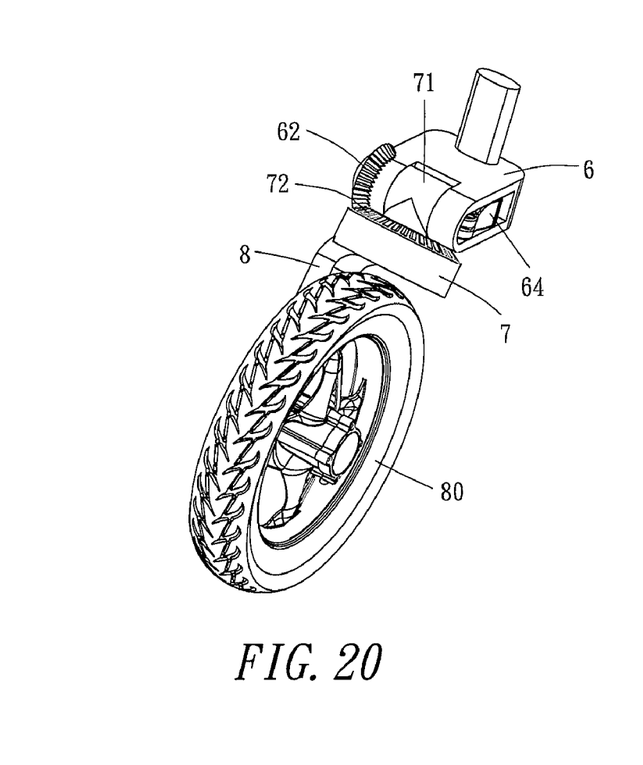
FIG. 20 is a three-dimensional view of the fourth exemplified embodiment of this invention.
Figure 21:
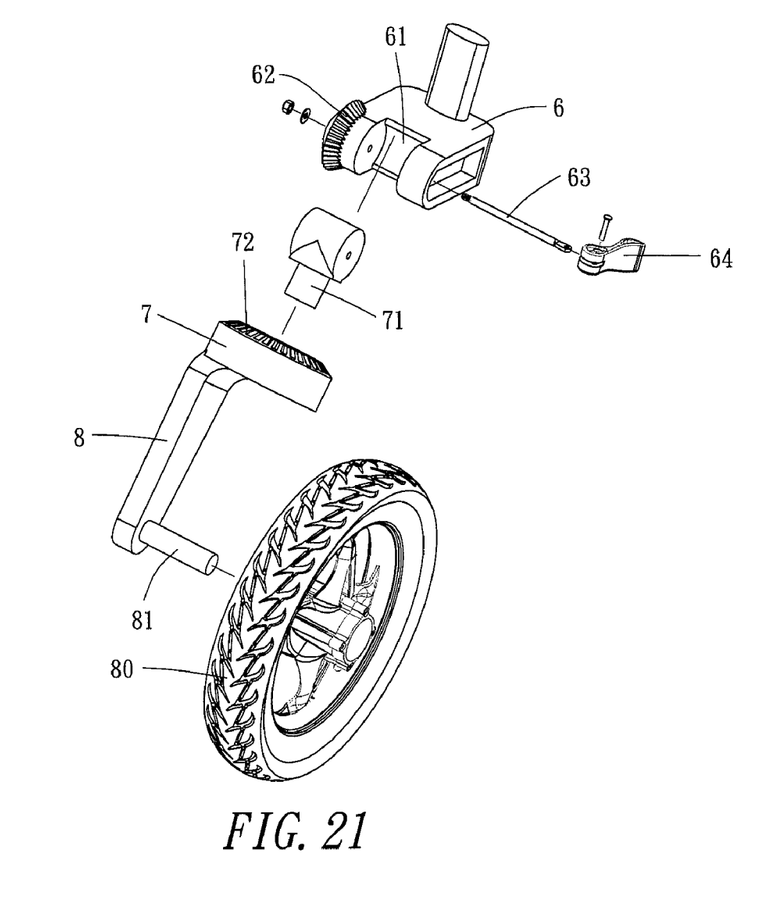
FIG. 21 is a three-dimensional exploded view of the fourth exemplified embodiment of this invention.
Figure 22:
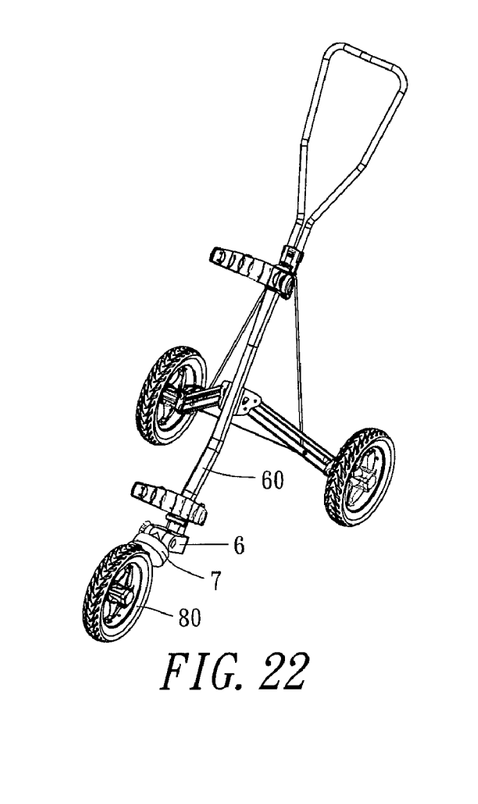
FIG. 22 is a three-dimensional view of the entire cart of the fourth exemplified embodiment of this invention.

Referring to FIGS. 20~22, this is the fourth exemplified embodiment of the present invention, which comprises a fixed mount 6, a movable mount 7 and a front wheel frame 8. The fixed mount 6 has one end connected to a bottom tube 60 of the cart frame, while the other end is provided with a cavity 61. The cavity 61 is provided with the fitted end of a first spiral bevel gear 62 at its one side, and the center of the gear is penetrated by a locking pin 63. The locking pin 63 is in pinned connection with a buckle 64 at its one end.

The movable mount 7 joined fixedly to a hinge 71 at its center. The top end of the hinge 71 is placed in the cavity 61 of the fixed mount 6 and pivoted on the locking pin 63, which links the movable mount 7 and the fixed mount 6. The movable mount 7 is provided with the fitted end of a second spiral bevel gear 72 at its top end, and it is in a bridle joint with the first spiral bevel gear 62.

The front wheel frame 8 has a top end joined fixedly with the movable mount 7 has a bottom joined to the front wheel 80 by a shaft 81.

According to the above structural combination, the fixed mount 6 and the movable mount 7 of the present embodiment have a fitted end for connecting to each other, which actually are the first spiral bevel gear 62 and the second spiral bevel gear 72. The hinge 71 is seized by the buckle 64, which joins the fixed mount 6 and the movable mount 7 fixedly. The hinge 71 is located at the bottom end of the bottom tube 60.

Figure 23:
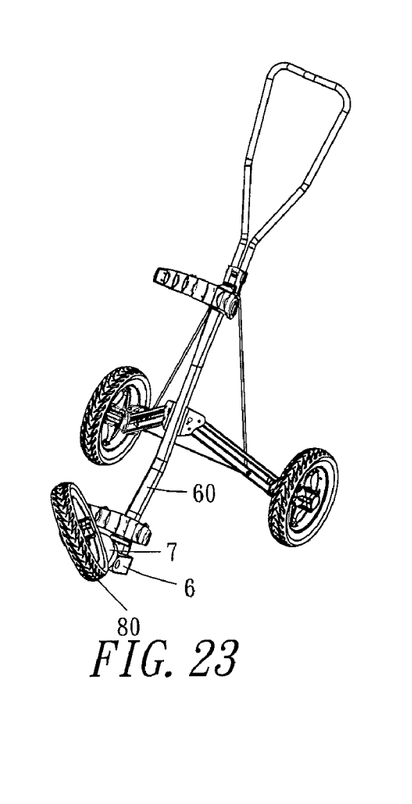
FIG. 23 is a schematic diagram of the motion of the folding of the fourth exemplified embodiment of this invention.
Figure 24:
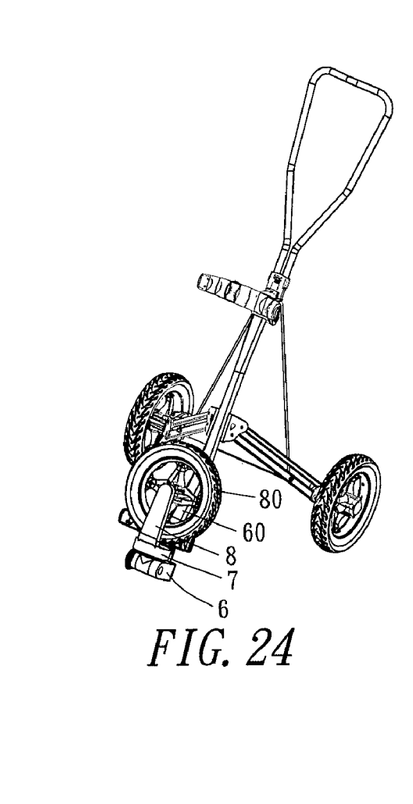
FIG. 24 is a schematic diagram of the folding of the fourth exemplified embodiment of this invention.
Figure 25:
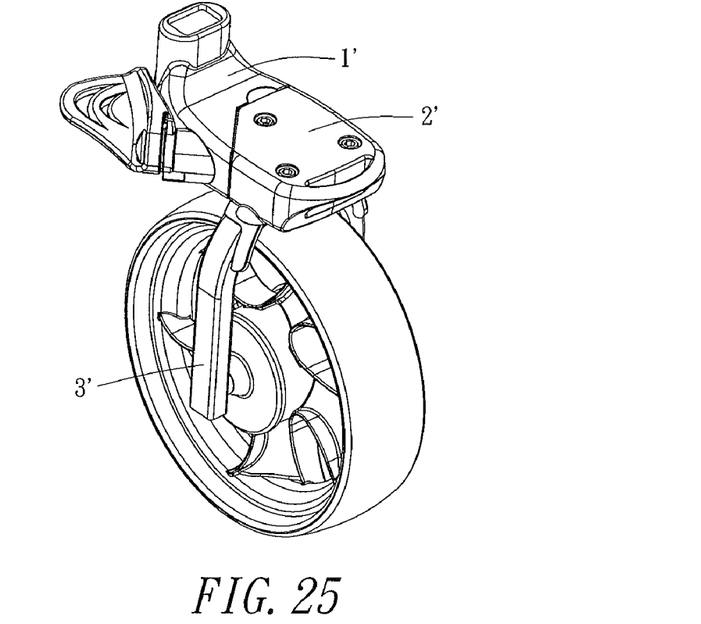
FIG. 25 is a schematic diagram of the fifth exemplified embodiment of this invention.
Figure 26:
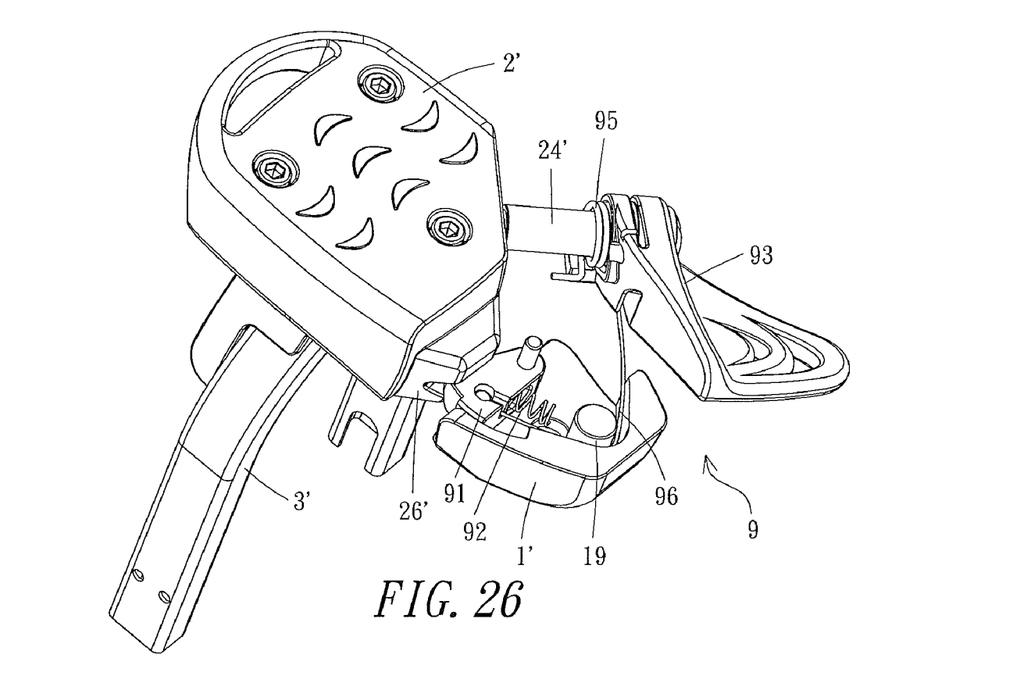
FIG. 26 is a schematic fragmentary sectional view of the fifth exemplified embodiment of this invention.
Figure 27:
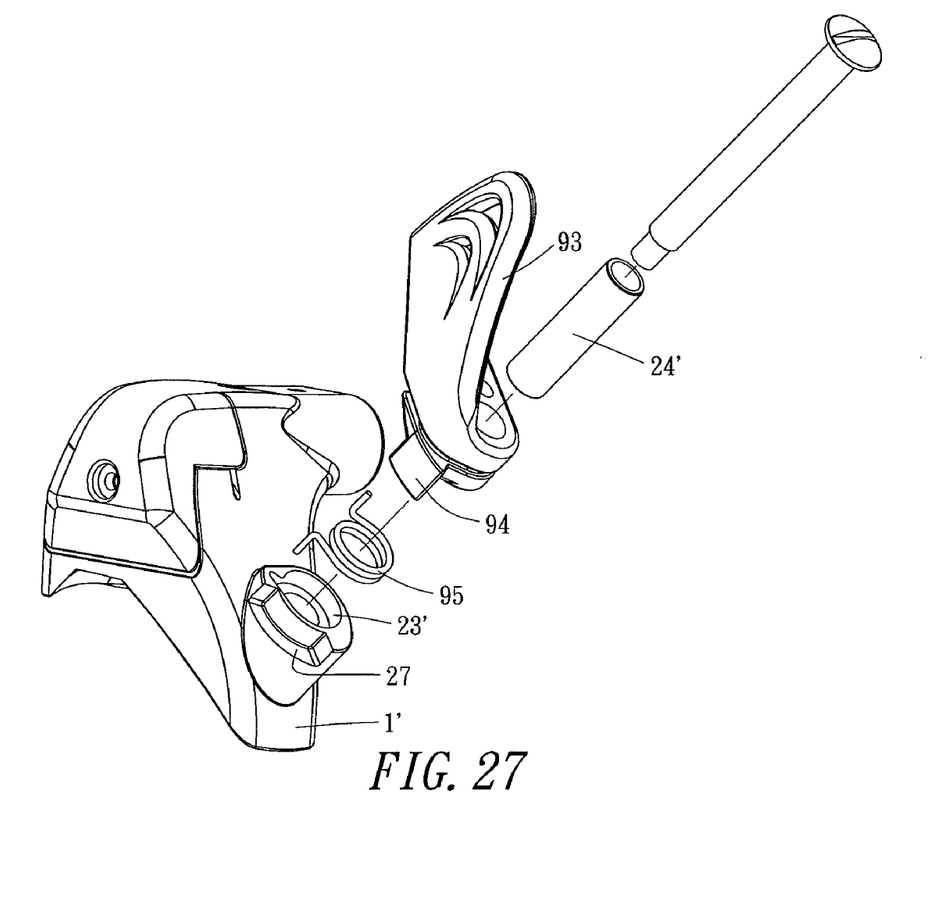
FIG. 27 is a three-dimensional exploded view of the movable mount portion of the fifth exemplified embodiment of this invention.
Figure 28:
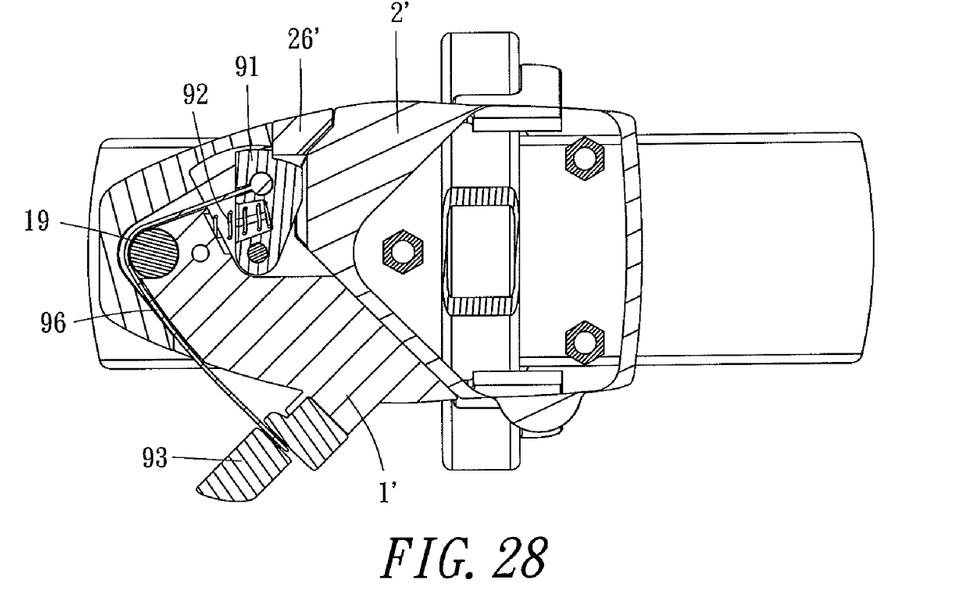
FIG. 28 is an assembled sectional view of the fifth exemplified embodiment of this invention.

When folding, the procedure starts by loosening the buckle 64 by pulling it outward to disconnect with the hinge 71. The locking pin 63 is then taken as the axis for the movable mount 7 and the front wheel frame 8. Through the rotation relayed from the first spiral bevel gear 62 to the second spiral bevel gear 72, the movable mount 7, the hinge 71 and the front wheel frame 8 are available to be rotated and pulled upward, which enables the front wheel 80 to be leveled for folding and attaching to the outer side of the cart frame, shown in FIGS. 23 & 24. By pressing the buckle 64 more tightly, the movable mount 7 and the front wheel frame 8 (the front wheel 80) are stabilized, which will achieve the same function as in the aforesaid first exemplified embodiment.

Referring to FIGS. 25-28, this is the fifth exemplified embodiment of the present invention, which is approximately similar to the first exemplified embodiment, comprising a fixed mount 1', a movable mount 2' and a front wheel frame 3'. The difference lies in the buckle 9 part. The buckle 9 includes a body 91 pivoted in the fixed mount 1' and available for seizing or releasing the bulge 26' of the movable mount 2'. The outer side of the middle section of the body 91 is jostled by a spring 92. A lever 93 is set up at the outer end of the hinge 24', for being pressed by the hand or the foot. The lever 93 has a guided chunk 94 at one side of its bottom, which is placed in a guided trough 27, exterior to the mount hole 23' of the fixed mount 1'. A torque spring 95 is put around the hinge 24' and having it has both ends joined fixedly to the fixed mount 1' and the lever 93 respectively. A linking piece 96, for instance a steel rope, has one end joined fixedly to the lever 93 while the other end is joined to the body 91. The middle portion of the linking piece 96 winds its way through the outer side of a tube shroud 19. The tube shroud 19 is used to link to the bottom tube of the cart frame.

Figure 29:
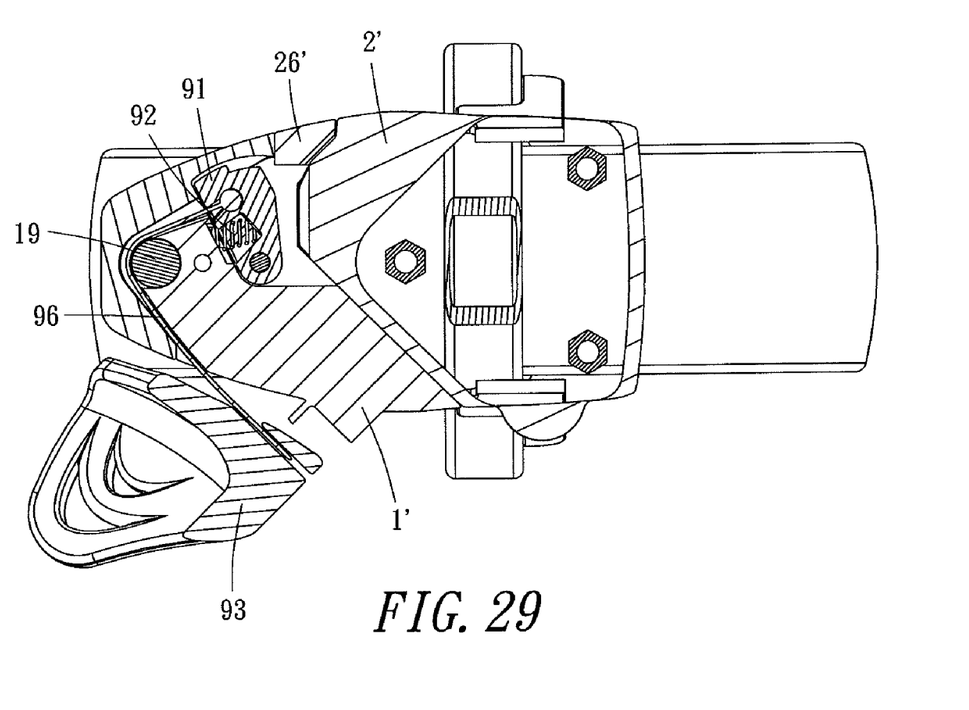
FIG. 29 is a schematic sectional view of the loosening of the buckle of the fifth exemplified embodiment of this invention.

According to the above structural combination, when folding, the lever 93 can be pressed by the hand or the foot, which moves the guided chunk 94 down in the guided trough 27 and pulls the linking piece 96 at the same time, to disconnect the body 91 with the bulge 26', shown in FIG. 29. According to the operational method of the first exemplified embodiment, the movable mount 2' and the front wheel frame 3' are rotated leftward and with respect to the hinge 24' defining the axis and pulled upward so that the front wheel is parallel to the outer side of the cart frame, for accomplishing the leveling of the front wheel for folding purposes. By releasing the lever 93, it will return to its original position by the restored force of the torque spring 95. Meanwhile, the linking piece 96 and the body 91 return to their origins automatically through the restored force of the spring 92, which is back to the status shown in FIG. 28. The body 91 seizes the bulge 26', to stabilize the fixed mount 1' and the movable mount 2', which accomplishes the function as in the aforesaid first exemplified embodiment.

Accordingly, maneuvering made by the embodiments of this invention to level the front wheel for folding purposes can be completed in one succession, which signifies handiness in maneuvering and plainness in the structure.

What is claimed is:

1. A golf bag cart front wheel foldable device, comprising:
   a.) a fixed mount having one end connected to a bottom tube of a cart frame and another end provided with a fitted end, wherein the fitted end is in pinned connection with a buckle at one side;
   b.) a movable mount capable of being fastened by the buckle and being joined fixedly to said fixed mount by a hinge, wherein one end of the movable mount is provided with a fitted end which mates with said fixed mount; and
   c.) a front wheel frame having a top end connected fixedly to said movable mount, while a bottom end of the front wheel frame is joined to a front wheel; wherein with the buckle loosened, said movable mount is not seized and said movable mount and said front wheel frame is rotatable with respect to the hinge and the front wheel is leveled for folding purposes, to achieve handiness in maneuvering.

2. A golf bag cart front wheel foldable device according to claim 1 wherein the fitted ends of said fixed mount and said movable mount are a cavity and a protrusion.

3. A golf bag cart front wheel foldable device according to claim 1 wherein the fitted ends of said fixed mount and said movable mount are slopes which mate with each other.

4. A golf bag cart front wheel foldable device according to claim 1 wherein the fitted ends of said fixed mount and said movable mount are spiral bevel gears in a bridle joint with each other.

5. A golf bag cart front wheel foldable device according to claim 1 wherein said fixed mount is provided with a chamber and is in pinned connection with the buckle by a locking pin, wherein the buckle is jostled by a spring at an outer side of a middle section to form a springy buckle.

6. A golf bag cart front wheel foldable device according to claim 1 wherein said movable mount is provided with a bulge for seizure by the buckle.

7. A golf bag cart front wheel foldable device according to claim 1 wherein the buckle comprises:
   a.) a body pivoted in said fixed mount and available for seizing or releasing a bulge of said movable mount, wherein an outer side of a middle section of the body is jostled by a spring;
   b.) a lever, set up at an outer end of the hinge, for being pressed by a hand or a foot, with the lever having a guided chunk at one side of a bottom and placed in a guided trough of said movable mount;
   c.) a torque spring around the hinge and having both ends joined fixedly to said lever and said movable mount; and
   d.) a linking piece having one end joined fixedly to said body and another end to said lever, wherein a middle portion is wound through an outer side of a tube shroud of said fixed mount.

8. A golf bag cart front wheel foldable device according to claim 1 wherein the hinge is located at bottom of the bottom tube of the cart frame.

9. A golf bag cart front wheel foldable device according to claim 1 wherein the hinge is joined fixedly to the bottom tube of the cart frame.

* * * * *